United States Patent [19]
Richter

[11] Patent Number: 6,002,940
[45] Date of Patent: Dec. 14, 1999

[54] MOBILE RADIO STATION

[75] Inventor: Thomas Richter, Lauf, Germany

[73] Assignee: U.S. Philips Corporation, New York, N.Y.

[21] Appl. No.: 08/903,286

[22] Filed: Jul. 30, 1997

[30] Foreign Application Priority Data

Aug. 7, 1996 [DE] Germany .................. 196 31 874

[51] Int. Cl.$^6$ .................................................. H04B 7/00
[52] U.S. Cl. .................... 455/502; 455/455; 455/510; 370/503
[58] Field of Search .................. 455/38.3, 422, 455/343, 502, 517, 515, 434, 510, 455; 370/331, 334, 350, 503; 375/356, 357

[56] References Cited

U.S. PATENT DOCUMENTS

| | | | |
|---|---|---|---|
| 4,972,355 | 11/1990 | Mullins | 455/515 |
| 5,280,541 | 1/1994 | Marko et al. | 455/465 |
| 5,293,641 | 3/1994 | Kallin et al. | 455/510 |
| 5,345,596 | 9/1994 | Buchenhorner et al. | 455/510 |
| 5,384,828 | 1/1995 | Brown et al. | 455/465 |
| 5,857,146 | 1/1999 | Kido | 455/38.3 |
| 5,884,178 | 3/1999 | Ericsson et al. | 455/422 |

Primary Examiner—Nguyen Vo
Assistant Examiner—Greta J. Fuller
Attorney, Agent, or Firm—Dicran Halajian

[57] ABSTRACT

A mobile radio station is disclosed having a device for synchronization with data streams transmitted over radio channels by base stations of a cellular mobile radio network. After an erroneous attempt at synchronization with a radio channel that has a receiving level, another attempt at synchronization with the radio channel is made after a delay. The delay depends on the receiving levels of different radio channels, the number of erroneous synchronization attempts, the number of radio channels with which the mobile radio station has already been synchronized, or the velocity of the mobile radio station. A new delay may also be obtained based on the old delay and the last two receiving levels.

9 Claims, 2 Drawing Sheets

MOBILE RADIO STATION

BACKGROUND OF THE INVENTION

The invention relates to a mobile radio station comprising means for synchronization with data streams transmitted by base stations of a cellular mobile radio system over radio channels.

GSM mobile radio systems (Global System for Mobile communications) comprise a network of radio cells. But each radio cell has a base station which radiates radio signals for mobile radio stations located in such a radio cell, a data traffic between a base station and mobile radio stations being effected over radio channels while use is made of the TDMA multiplex technique (Time Division Multiple Access). If a user of a mobile radio station moves with his station from one radio cell to a neighboring radio cell, there is to be ensured that a bidirectional radio link to at least one base station is available without interruptions, with a quality sufficient for an error-free data exchange. For this purpose, a mobile radio station in operation monitors all the available RF channels (Radio Frequency radio channels) of the mobile radio system (compare GSM 05.08, DRAFT pr ETS 300 578, March 1995, Second Edition, to which also the following state of the art implementations relate; when other parts of the GSM recommendations are cited in the following, also the respective version, dated March 1995, is meant). During this monitoring operation, the receiving levels of the RF channels are measured and an average receiving level is determined from a plurality of measured receiving levels of an RF channel. For a cell selection or cell reselection, i.e., for setting up a connection to the base station of such a radio cell, the mobile station is to be in a position to synchronize with the carrier frequency of a so-termed BCCH (Broadcast Control Channel) transmitted by the base station, and to read BCCH data. BCCH data contain system information and the so-termed BSIC (Base Transceiver Station Identity Code, Base Station Transceiver Code). A radio cell selected in this way is called a serving cell. In accordance with the standardized GSM recommendations, a mobile radio station is to try at least every thirty seconds to decode the BSIC of a serving cell. Furthermore, a mobile radio station is expected to verify at least every 30 seconds the BSIC of the other radio cells having the highest average receiving level. The BSIC is transmitted over the BCCH in signal beams by means of Synchronization Bursts (SB). A so-termed cell change function is carried out in which the function of serving cell changes to another radio cell based on the evaluation of the receiving level and the evaluation of the BSIC.

The operations of synchronization with a BCCH carrier frequency and of the decoding of a BSIC, require energy and form a load on the energy store of a mobile radio station. As a rule, accumulators are used as energy stores. Especially with mobile radio stations, this is a critical item. The smaller the energy consumption when a mobile radio station is operated, the longer such a mobile radio station can be operated, until a renewed charging of the accumulator is necessary, so that the user's convenience is enhanced.

OBJECTS AND SUMMARY OF THE INVENTION

Therefore, it is an object of the invention to provide a mobile radio station whose energy consumption compared with mobile radio stations known thus far is lowered, without functions of the mobile radio station being affected that can be noticed by a user.

The object is achieved in that, after an erroneous attempt at synchronization with a first radio channel that has a certain receiving level, another attempt at synchronization with the first radio channel is made after a delay which depends on the receiving level of the first radio channel.

The lower the receiving level of the first radio channel, the less probable it will be that the associated base station or radio cell respectively, is considered a serving cell for a reselection/cell change. A lower receiving level may be the result of an increased distance to the transmitting base station, or also radio signal attenuation as a result of the available terrain features (fading effects). As the delay is increased when there is a lower receiving level, the power consumption of the mobile radio station may be reduced without the reselection/cell change function of the mobile radio system being noticeably affected. More particularly, an average value is formed from a plurality of measured receiving levels of the first radio channel, the delay then depending on this average value. The standby time of the mobile radio station is then increased.

Particularly the delay is formed by the sum of a predefinable minimum delay value and a value proportional to the difference between the receiving level of a second radio channel over which a connection to a base station is set up at that moment, and the receiving level of the first radio channel. At the instant at which the delay is to be computed, there is just the connection between the mobile radio station and a serving cell over the second radio channel. When the receiving level of the first radio channel rises, the said difference and thus the delay is reduced. The minimum delay value in GSM systems denotes the lower boundary for the delay according to the GSM recommendations.

In an embodiment of the invention, the delay depends on the number of attempts at synchronization with the first radio channel which have thus far been erroneous and/or on the number of radio channels with which the mobile radio station has already been synchronized. The larger the number of erroneous attempts at synchronization with a first radio channel, the smaller the probability will be that a synchronization with a first radio channel is at all possible. The probability that the radio cell belonging to the first radio channel is selected for a cell change, is very small. Furthermore, with an increasing number of radio channels with which the mobile radio station has already been synchronized, it becomes less important to synchronize the mobile radio station with additional radio channels, because the probability of malfunctioning with a cell change has already diminished considerably. In both cases, an increase of the delay till the next attempt at synchronization less probably leads to cell change errors. At the same time, a further reduction of the power consumption of the mobile radio station is achieved.

Preferably, in accordance with the previous reflections, on the one hand, the delay is formed by the sum of a predefinable minimum delay value and a value proportional to the number of thus far erroneous attempts at synchronization with the first radio channel and, on the other hand, because the delay is formed by the sum of a predefinable minimum delay value and a value proportional to the number of radio channels with which the mobile radio station has already been synchronized. This produces simple formulas for computing the delay. A minimum delay as required in the GSM recommendations is guaranteed.

In another embodiment, the delay depends on the velocity of the mobile radio station relative to the base station to which base station the first radio channel is assigned. The larger the relative velocity, the smaller the respective delay needs to be to guarantee that a radio cell selection or reselection and the associated synchronizations are effected as far ahead as possible of the instant at which the maximum receiving level of a radio cell is achieved after this radio cell has been entered. Then the period is extended in which a radio link having sufficient quality inside such a radio cell is available to the mobile radio station. Preferably, the relative velocity between the mobile radio station and a base station is taken into account in that the delay is determined by the sum of a predefinable minimum delay value and a value inversely proportional to the velocity of the mobile radio station relative to the base station to which the first radio channel is assigned, so that the computation of the delay is modified to a manner that is easy to implement.

In again another embodiment of the invention, the delay is adapted, which adapted delay depends on the previous delay and on the difference of the receiving levels which difference results from the last two measurements of the receiving levels. In this manner, the delay may be adapted to any changes of the receiving level of the first radio channel at the location of the mobile radio station. More particularly, the adaptation of the delay is realized in that the adapted delay is the sum of the previous delay and a value proportional to the difference between the receiving levels of the last two receiving level measurements. When the receiving level drops, the previous delay is increased, when a receiving level rises, the delay is reduced, so that, with a radio channel having a rising receiving level, the time until the next attempt at synchronization is reduced, because the probability that such a radio channel is suitable for a cell change has enhanced together with the increased receiving level.

The invention likewise relates to a mobile radio station of the type defined in the opening paragraph in which, after an erroneous attempt at synchronization with a radio channel, a further attempt at synchronization with the radio channel is provided after a delay that depends on the number of thus far erroneous attempts at synchronization with the first radio channel, or on the number of radio channels with which the mobile radio station has already been synchronized, without the receiving level of the radio channel having an effect on the computation of the delay. These measures too lead to a reduction of the power consumption of the mobile radio station.

The invention likewise relates to a cellular mobile radio system, more particularly, a GSM mobile radio system in which a mobile radio station according to the invention can be utilized.

These and other aspects of the invention will be apparent from and elucidated with reference to the embodiments described hereinafter.

DETAILED DESCRIPTION OF THE PREFERRED EMBODIMENT

Figure 1:
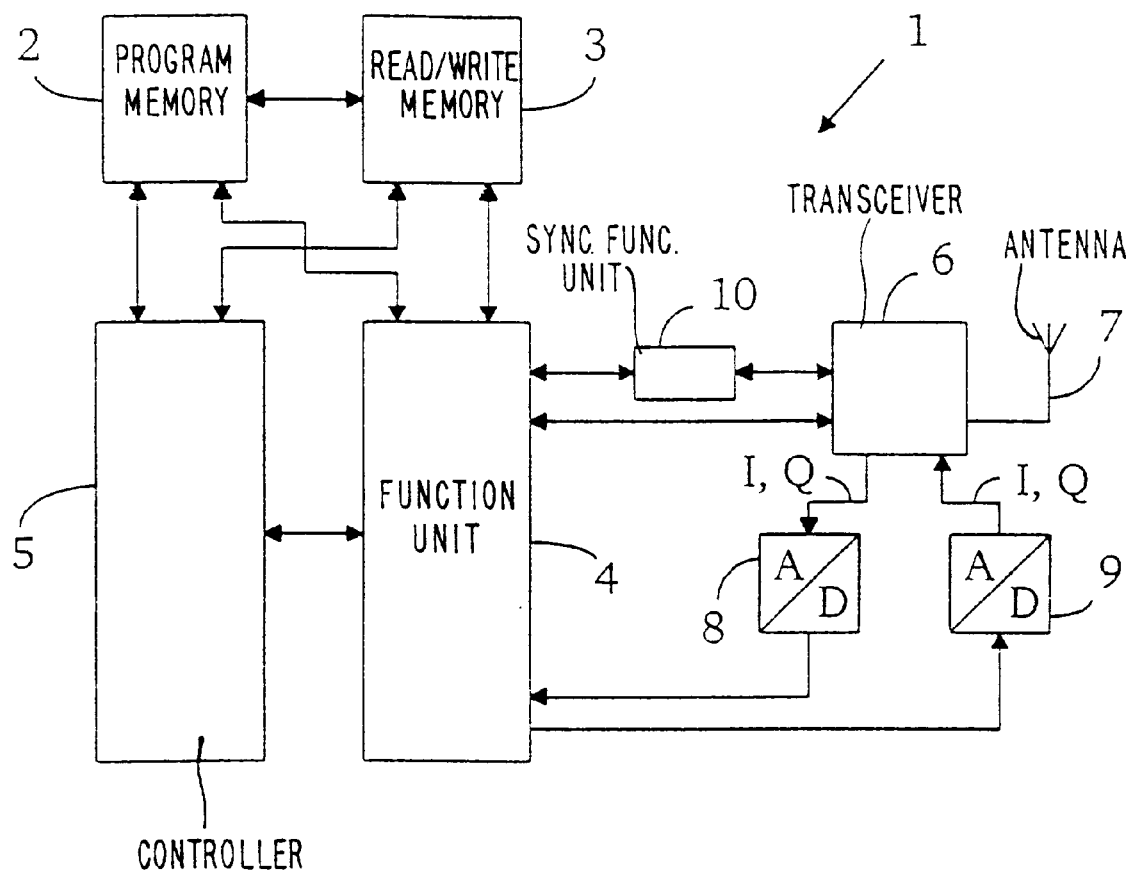
FIG. 1 shows a block diagram of a mobile radio station.

The mobile radio station 1 shown in FIG. 1 comprises a program memory 2 (for example, an EPROM or a PROM), a read/write memory 3 (RAM) and a function unit 4 provided by means of a digital signal processor (DSP) which function unit is used for converting signal processing algorithms. The function unit 4 also provides the conversion of algorithms for speech processing, channel coding/decoding and multiplex/demultiplex functions. The mobile radio station according to the invention is particularly an apparatus according to the GSM mobile radio standard for cellular mobile radio networks, so that the TDMA (Time Division Multiple Access) method is used here as a multiplex/demultiplex method. When the mobile radio station 1 is in operation, the program memory 2, the read/write memory 3 and the function unit 4 communicate with a controller 5 which is provided in microprocessor technology and controls all the program runs in the mobile radio station 1.

The mobile radio station 1 further includes a transceiver 6 used for transmitting and receiving radio signals via an antenna 7. The transceiver 6 comprises means for converting received radio signals to their quadrature components I and Q, which are converted into digital signals by an analog/digital converter 8 and are transferred to the function unit 4 to be processed further. In addition, an analog/digital converter 9 is provided, which is used for converting digital signals produced by the function unit 4 to quadrature components I and Q which are converted by the transceiver 6 into radio signals to be transmitted via the antenna 5.

The mobile radio station 1 also includes a synchronization function unit 10, used for synchronizing the transceiver 6 and the function unit 4 with certain radio channels (ie with data streams transmitted over the respective radio channels), over which radio channels radio signals are transmitted by a base station of a cellular mobile radio network. The synchronization function unit 10 may also be integrated with the transceiver 6. Further components of the mobile radio station 1, which are unessential for comprehending the invention, are not shown for clarity.

For a more detailed description of the invention, the mobile radio station 1 will be further described as an embodiment according to the GSM recommendations.

In the so-termed idle mode, the mobile radio station 1 receives system information from a base station arranged in a radio cell of a cellular mobile radio network (PLMN), in whose coverage area or radio cell respectively the mobile radio station 1 is located at that moment. Via the system information, the mobile radio station 1 also receives information about neighboring cells of the radio cell in which the mobile radio station 1 is located at that point. This information is stored in a so-termed BA list in the base station that transmits the system information. By means of the BA list, radio frequency channel numbers (ARFC, Absolute Radio Frequency Channel Numbers) are assigned to the neighboring cells. The BA list contains up to 32 radio frequency channel numbers. Each ARFCN defines one radio channel by which a communication between the mobile radio station 1 and the respective base station can take place. A software module denoted RRM (Radio Resource Manager) controls a monitoring of the field strengths of the serving cell and of the neighboring cells of this serving cell. The functions of the RRM are further explained in the GSM specifications 03.09 and 05.08 which relate to the communication control functions, and in the GSM specification 04.04 which describes so-termed layer 1 protocols.

In the GSM specification 05.08 is stated that the BSIC of the serving cell is to be read by the mobile radio station 1 at least every 30 seconds. The BSIC of the neighboring cells having the six highest receiving levels is also to be read by the mobile radio station 1 every 30 seconds. Under the control of the RRM, a measuring system (not further shown) arranged in the transceiver 6 carries out a measurement of the receiving level every 5 seconds. The receiving level is evaluated by the function unit 4 controlled by the RRM. The stored receiving level value relating to a radio channel is updated by forming the arithmetical mean from the receiving level value and the measured receiving level value:

$$level_{new} = (level_{old} + level_{meas})/2$$

with $level_{new}$=updated, new receiving level value,
$level_{old}$=old, stored receiving level value and
$level_{meas}$=measured receiving level value.

In this manner, a moving average is formed which smooths strong level fluctuations.

The reading of a BSIC of a base station is linked with the synchronization function unit 10 synchronizing the function unit 4 and the transceiver 6 with the respective radio channel by which the respective BSIC is transmitted. The synchronization functions are described in detail in the GSM specification 05.10. Converting these functions is linked with a power consumption that cannot be disregarded.

It is quite possible that not all the radio channels of neighboring cells can be synchronized with the six highest receiving levels. For example, superimposed noise signals or fading effects may lead to radio channels not allowing of synchronization. Nevertheless, present mobile radio stations attempt to synchronize with such radio channels with which synchronization is impossible. This leads to an increased power consumption and to a reduction of the standby time.

In order to overcome this problem, it would be conceivable to simply suppress further synchronization attempts after it has been established that a radio cell cannot be synchronized. Such an approach, however, does not do justice to the fact that a radio channel that cannot be synchronized at a certain instant can be synchronizable at a later instant, because noise signals and fading effects may certainly be bounded with time. Providing a delay that determines the distance in time between an erroneous synchronization attempt and a renewed synchronization attempt leads to a technical realization that tackles the problem better. The computation of a suitable delay will be described hereinafter.

The delay in respect of a radio channel assigned to a specific radio cell n depends according to the invention on the receiving level $level_n$ relating to this radio channel, on the number of erroneous attempts at synchronization with the radio channel assigned to the radio cell n, and on the number of neighboring cells of the radio cell n which have associated radio channels with which the mobile radio station 1 has already been synchronized. Accordingly, the delay referenced $d_n$ in the following is computed in the following manner:

1. If $level_{serv} < level_n$, then $d_n$=MIN_DELAY_IDLE
2. If $level_{serv} \geq level_n$, $d_n$ is computed according to the following formula:

$$d_n = MAX\_DELAY\_IDLE \cdot C1 \cdot C2 \cdot C3 + MIN\_DELAY\_IDLE$$

with $$C1 = \frac{level_{serv} - level_n}{MAX\_LEVEL\_GSM - RXLEV\_ACC\_MIN},$$

$$C2 = \frac{m_{err}}{MAX\_SYNC\_ERR\_IDLE},$$

$$C3 = \frac{m_{neigh}}{MAX\_SYNC\_CELL\_IDLE}.$$

3. If $d_n$>Max_DELAY_IDLE, then $d_n$=Max_DELAY_IDLE

The abbreviations used have the following connotations:

| | |
|---|---|
| $d_n$ = | delay for a radio channel n (having a respective ARFCN) assigned to a radio cell n; |
| $level_{serv}$ = | receiving level relating to the radio cell just performing the function of serving cell for the mobile radio station 1; |
| $level_n$ = | measured receiving level of the radio channel n; |
| $m_{err}$ = | number of the last erroneous attempts of the mobile radio station 1 at synchronization with the radio channel n; |
| $m_{neigh}$ = | number of neighboring cell radio channels with which the mobile radio station 1 has just been synchronized; |
| MAX_LEVEL_GSM = | maximum receiving level according to GSM 05.08, chapter 8.1.4 (>−48 dbm RXLEV63); |
| RXLEV_ACC_MIN = | minimum receiving level at which a radio channel assigned to a radio cell is actually considered for a communication with the mobile radio station 1 (in the range between −106 dbm and −105 dbm respectively, RXLEV 5); |
| MIN_DELAY_IDLE = | minimum delay in the idle mode (for example, 15 seconds); |
| MAX_DELAY_IDLE = | maximum permissible delay in the idle mode (for example, 75 seconds); |
| MAX_SYNC_CELL_IDLE = | maximum number of neighboring cells in the idle mode (preferably equal to the number of neighboring cells (32) in the BA list of the serving cell); |
| MAX_SYNC_ERR_IDLE = | maximum number of erroneous attempts at synchronization with a radio channel in the idle mode (for example, 15). |

The formula for computing the delay $d_n$ is based on the following considerations:

1. The lower the receiving level $level_n$ relating to a radio channel n, the less probable it is that the base station BSn or radio cell n respectively, assigned to the radio channel n, is considered for a selection or reselection as a serving cell (cell selection, cell reselection/cell change).
2. With the number $n_{err}$ of erroneous attempts at synchronization with a radio channel n, the probability increases that a synchronization with this radio channel is actually possible. Accordingly, the delay $d_n$ is to be increased.

3. The more radio channels from the group of six radio channels having the highest receiving levels at the location of the mobile radio station 1 are already available, with which the mobile radio station 1 has already been synchronized successfully, the less important it is to synchronize the mobile radio station 1 with the rest of the group of six radio channels mentioned. For this reason, the number $m_{neigh}$ of the radio channels of the neighboring cells with which the mobile radio station has already been synchronized, has a proportional effect on the computation of the delay $d_n$.

It is also possible to determine the delay $d_n$ in a simpler manner in that the delay $d_n$ does not depend on all three parameters $level_n$, $m_{err}$ and $m_{neigh}$, but either only on the parameter $level_n$, only on the parameter $m_{err}$, only on the parameter $m_{neigh}$, only on the two parameters $level_n$ and $m_{err}$, only on the two parameters $level_n$ and $m_{neigh}$, or only on the two parameters $m_{err}$ and $m_{neigh}$. When the delay $d_n$ is determined in such a manner, this already leads to a reduction of the power consumption of the mobile radio station 1 in the standby mode. The following equations can be used for determining the delay $d_n$:

1. $d_n$=MAX_DELAY_IDLE·C1+MIN_DELAY_IDLE

2. $d_n$=MAX_DELAY_IDLE·C2+MIN_DELAY_IDLE and

3. $d_n$=MAX_DELAY_IDLE·C3+MIN_DELAY_IDLE.

4. $d_n$=MAX_DELAY_IDLE·C1·C2+MIN_DELAY_IDLE

5. $d_n$=MAX_DELAY_IDLE·C1·C3+MIN_DELAY_IDLE and

6. $d_n$=MAX_DELAY_IDLE·C2·C3+MIN_DELAY_IDLE.

With respect to radio channels with which the mobile radio station 1 could be synchronized successfully, the GSM recommendations prescribe the following actions of the mobile radio station 1 which, however, are unessential to the invention.

In the following will be described how the delay can be determined better to achieve an even further reduced power consumption of the mobile radio station 1. Such an embodiment of the invention relates to an adaptation of a delay $d_n$ already computed at least once in dependence on changes in the receiving level of the associated radio channel. The delay is then adapted according to the following formula:

$$d_{n,new} = d_{n,old} + \frac{level_{n,old} - level_{n,new}}{MAX\_GSM\_LEVEL - RXLEV\_ACC\_MIN} \cdot MAX\_DELAY\_IDLE.$$

with $d_{n,\,new}$=new delay with respect to the radio channel n;

$d_{n,\,old}$=old delay with respect to the radio channel n;

$level_{n,\,old}$=old receiving level value with respect to the radio channel n, stored in the mobile satation;

$level_{n,\,new}$=new receiving level value with respect to the radio channel n;

MAX_LEVEL_GSM=see above;

RXLEV_ACC_MIN=see above;

MAX_DELAY_IDLE=see above;

Depending on how often receiving levels are measured between two synchronization attempts, it is thus possible with the formula stated above to determine a new delay value $d_{n,new}$ recursively from the old delay value $d_{n,old}$ in dependence on a change of the receiving level. The formula shows that a rise of a receiving level leads to a reduction of the delay and a drop of the receiving level leads to an increase of the delay. When the receiving level rises, the period of time till the next attempt at synchronization with the associated radio channel is shortened. Conversely, a diminishing receiving level will extend a period of time till the next attempt at synchronization with the associated radio channel. For the case where a negative value is computed for the new delay value $d_{n,new}$ in accordance with the formula stated above, $d_{n,new}$ is set to zero, ie an attempt at synchronization with the associated radio channel n is made forthwith.

Figure 2:
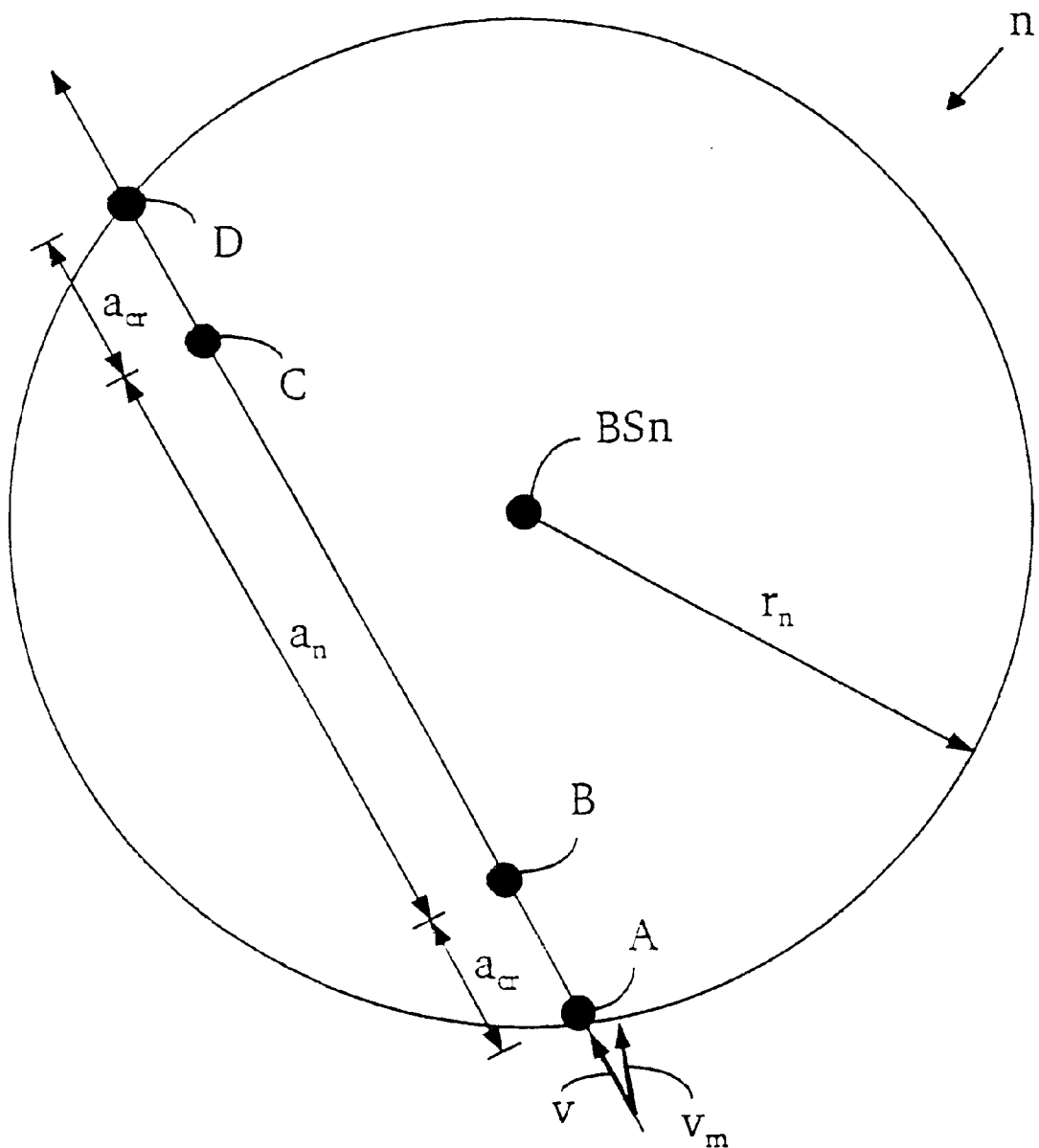
FIG. 2 shows a radio cell of a mobile radio system passed through by the mobile radio station.

A further improved computation of the delay will be explained in the following with reference to FIG. 2. FIG. 2 shows a radio cell n of a cellular mobile radio network/system with a base station BSn. The area covered by the base station BSn is represented by way of approximation by a circle having radius $r_n$. In reality, the area covered by the radio cell n generally has a form that differs from the circle, which is caused by the environment of the base station BSn and also by radio level ratios changing with time. The line along points A, B, C and D denotes a possible path of the mobile radio station 1 through the radio cell n. The velocity of the mobile radio station 1 is denoted by the vector arrows referenced v and $v_m$. v is to indicate the real velocity of the mobile radio station 1 in the direction the station moves in. $v_m$ indicates the velocity component in the direction to the base station BSn. The velocity component $v_m$ is measured and considered a relative velocity between the mobile radio station 1 and the base station BSn. $v_m$ can be measured, for example, by evaluating the so-termed Doppler effect. The velocity component $v_m$ is usually a good approximation for the real velocity v for cases with high velocities of the mobile radio station 1, for example, when used in motor vehicles driving on motorways, because it may be assumed that base stations which are to cover a motorway section are positioned in the neighborhood of the respective motorway. The velocity $v_m$ has such an effect on the computation of a delay $d_n$ that an increased velocity reduces the delay of $d_n$ and a reduced velocity $v_m$ leads to a higher delay $d_n$. More particularly, the velocity $v_m$ is inversely proportional to the value MAX_DELAY_IDLE. At low velocities v or $v_m$ respectively, of the mobile radio station 1, the effect of velocity may be omitted from the computation of the delay, so that a larger deviation of v and $v_m$ is insignificant.

The point A in FIG. 2 denotes a point at which the mobile radio station 1 enters radio cell n. After covering the section $a_{cr}$, point B is reached which lies inside the radio cell n and is to denote the optimum point at which the radio cell n takes over the function of serving cell. After section $a_n$ has been covered, the mobile radio station 1 reaches point C which represents the optimum point for a transition of the function serving cell from the radio cell n to a neighboring cell. After the section $a_{cr}$, the point D is reached at which the mobile radio station 1 leaves the radio cell n.

In GSM mobile radio stations, the invention is also suitable for analog use in the so-called emergency idle mode in addition to the described use in the so-termed idle mode.

I claim:

1. A mobile radio station comprising means for synchronization with data streams transmitted over radio channels by base stations of a cellular mobile radio network, wherein, after an erroneous attempt at synchronization with a first radio channel that has a first receiving level, another attempt at synchronization with the first radio channel is made after a delay which depends on the first receiving level; said delay being formed by a sum of a predetermined minimum delay value and a value proportional to a difference between a second receiving level of a second radio channel which currently connects said mobile radio station to a base station and the first receiving level.

2. A cellular mobile radio system comprising at least one mobile radio station as claimed in claim 1.

3. A mobile radio station comprising means for synchronization with data streams transmitted over radio channels by base stations of a cellular mobile radio network, wherein, after an erroneous attempt at synchronization with a first radio channel that has a first receiving level, another attempt at synchronization with the first radio channel is made after a delay which depends on the first receiving level, wherein the delay is determined by a sum of a predetermined minimum delay value and a value proportional to a number of erroneous attempts at synchronization with the first radio channel.

4. A mobile radio station comprising means for synchronization with data streams transmitted over radio channels by base stations of a cellular mobile radio network, wherein, after an erroneous attempt at synchronization with a first radio channel that has a first receiving level, another attempt at synchronization with the first radio channel is made after a delay which depends on the first receiving level, wherein the delay is determined by a sum of a predetermined minimum delay value and a value proportional to a number of radio channels with which the mobile radio station has already been synchronized.

5. A mobile radio station comprising means for synchronization with data streams transmitted over radio channels by base stations of a cellular mobile radio network, wherein, after an erroneous attempt at synchronization with a first radio channel that has a first receiving level, another attempt at synchronization with the first radio channel is made after a delay which depends on the first receiving level, wherein the delay is determined by a sum of a predetermined minimum delay value and a value proportional to a velocity of the mobile radio station relative to a base station which is assigned the first radio channel.

6. A mobile radio station comprising means for synchronization with data streams transmitted over radio channels by base stations of a cellular mobile radio network, wherein, after an erroneous attempt at synchronization with a first radio channel that has a first receiving level, another attempt at synchronization with the first radio channel is made after a delay which depends on the first receiving level, said delay being changed to an adapted delay, wherein said adapted delay depends on a previous delay and on a difference between last two measurements of the receiving level.

7. A mobile radio station as claimed in claim 6, wherein the adapted delay is a sum of the previous delay and a value proportional to the difference between the last two measurements of the receiving level.

8. A mobile radio station comprising means for synchronization with data streams sent by base stations of a cellular mobile radio network and transmitted over radio channels, characterized in that an erroneous attempt at synchronization with a radio channel is followed by a further attempt at synchronization with the radio channel after a delay that depends on a sum of a predetermined minimum delay value and a value proportional to a number of erroneous attempts at synchronization with the radio channel.

9. A mobile radio station comprising means for synchronization with data streams sent by base stations of a cellular mobile radio network and transmitted over radio channels, characterized in that an erroneous attempt at synchronization with a radio channel is followed by a further attempt at synchronization with the radio channel after a delay that depends on a sum of a predetermined minimum delay value and a value proportional to a number of radio channels with which the mobile radio station has already been synchronized.

* * * * *